United States Patent [19]

Shimada

[11] Patent Number: 5,045,762
[45] Date of Patent: Sep. 3, 1991

[54] APPARATUS FOR CONTROLLING A BRUSHLESS MOTOR

[75] Inventor: Toshiro Shimada, Yokohama, Japan
[73] Assignee: Kabushiki Kaisha Toshiba, Kawasaki, Japan
[21] Appl. No.: 565,343
[22] Filed: Aug. 10, 1990
[30] Foreign Application Priority Data Aug. 14, 1989 [JP] Japan ................................. 1-207845

[51] Int. Cl.$^5$ ...................... H02P 6/02; H01L 27/02
[52] U.S. Cl. ................................................. 318/254
[58] Field of Search ........................ 318/138, 254, 439

[56] References Cited

U.S. PATENT DOCUMENTS

| | | | |
|---|---|---|---|
| 4,460,856 | 7/1984 | Mizumoto | 318/254 |
| 4,746,844 | 5/1988 | Mackelvie et al. | 318/254 |
| 4,788,483 | 11/1988 | Smith | 318/689 |
| 4,888,530 | 12/1989 | Radik et al. | 318/254 |
| 4,983,894 | 1/1991 | Oku et al. | 318/138 |

Primary Examiner—Bentsu Ro
Attorney, Agent, or Firm—Finnegan, Henderson, Farabow, Garrett, and Dunner

[57] ABSTRACT

A motor-controlling apparatus is disclosed, wherein the signal generated by the Hall element located near the rotor of a motor is amplified twice, first by an input amplifier and then by an output amplifier, thus producing two drive pulse signals which are out of phase and having a 180° duration. These signals are supplied to the motor coils of the motor and also to comparators connected at the output. The output currents of the comparators are thus combined, forming an output current, which is delayed and then converted into a voltage. This voltage is applied to the inverting input terminal of a two-input amplifier constituting a feedback circuit. A constant voltage is applied to the non-inverting input terminal of the two-input amplifier. The two-input amplifier generates a bias current, which is fed back to the output amplifier, thereby reducing the changes in the speed of rotation of the motor which result from the variation of the load on the motor. The constant voltage applied to the non-inverting input terminal of the two-input amplifier, or the resistance of the resistor connected to the inverting input terminal of the amplifier is changed, thereby to drive the motor at two or more different speeds of rotation.

3 Claims, 1 Drawing Sheet

APPARATUS FOR CONTROLLING A BRUSHLESS MOTOR

BACKGROUND OF THE INVENTION

1. Field of the Invention

The present invention relates to an apparatus for controlling a brushless motor, and more particularly to a motor-controlling apparatus made in the form of a semiconductor integrated circuit.

2. Description of the Related Art

Among motors used in small-sized tape recorders is a Hall motor. This motor can be controlled by various control devices, one of which is a Hall motor-controlling circuit which has a Hall element. The Hall motor-controlling circuit is located such that the Hall element is placed near the rotor of the Hall motor and detects the position of the rotor.

Let us assume that the Hall motor-controlling circuit supplies two drive pulse signals, out of phase and having a 180° C. duration, to the first ends of the two coils of the motor, respectively, whilst a predetermined voltage is applied between the second ends of the motor coils. In this case, the moment either drive pulse signal falls from a high level to a low level, a reverse voltage is generated in the first end of either coil due to the inductance of the coil. The reverse voltage is about twice the predetermined voltage applied between the second ends of the motor coils. It follows that the amplifier connected to the output of this motor-controlling circuit needs to withstand a voltage twice as high as the predetermined voltage. To make matters worse, the reverse voltage disable the circuit to output a signal whose level changes smoothly, inevitably resulting in rotation noise of the motor.

In the case of a Hall motor-controlling circuit made in the form of an integrated circuit, the sizes of its components are proportional to the withstand voltage which the circuit needs to have. Obviously, the larger the components, the difficult it is to increase the integration density of the circuit. On the other hand, in order to increase the withstand voltage of the circuit, the structure of the circuit must be complex. The more complex the structure, the more steps must be performed to manufacture the circuit, inevitably increasing the manufacturing cost of the circuit.

Let us assume that the Hall motor-controlling circuit described above is incorporated in a tape recorder and controls the motor used therein. In this case, the speed of rotation of the motor is maximal when no torque load is applied on it, and gradually decreases as the torque load on it increases during the tape-feeding operation. In other words, the speed of rotation of the motor changes with the load applied on the motor.

The conventional Hall motor-controlling circuit changes the speed of rotation of a motor, form a first predetermined value to a second value, by either of two alternative methods. The first method is to use an additional motor designed to rotate at the second speed. The second method is to change the drive voltage applied to the motor coil of the motor. Either method involves the use of additional components, and leads to a great increase in the manufacturing cost of the motor-controlling circuit.

SUMMARY OF THE INVENTION

The object of the present invention is to provide a motor-controlling apparatus which generates but a low reverse voltage and which can drive a motor at different speeds of rotation, while applying a constant voltage to the motor, and can also reduce the noise the motor may make while driven.

According to the present invention, there is provided a motor-controlling apparatus which comprises an amplifier for outputting a plurality of motor-driving voltages which are at a predetermined level and different in phase; a plurality of output terminal for applying the motor-driving voltages to the motor coils of a brushless motor; an external voltage input terminal for applying an external voltage to the motor coils of the brush less motor; comparator means for comparing the motor-driving voltage applied from each output terminal with the external voltage applied from the external voltage input terminal, and outputting a signal representing the difference between the voltages compared; and feedback means for feeding the signal output by the comparator means back to the amplifier.

DETAILED DESCRIPTION OF THE PREFERRED EMBODIMENTS

An embodiment of the invention, which is a motor-controlling apparatus, will now be described, with reference to the accompanying drawings.

Figure 1:
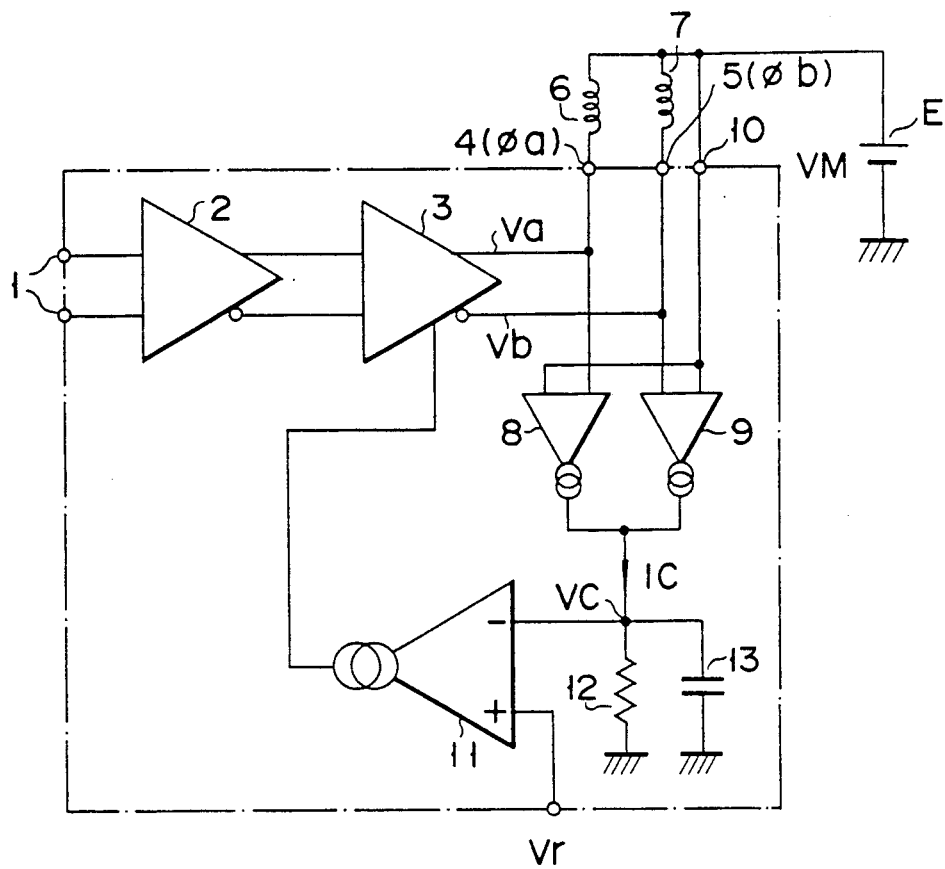
FIG. 1 is a circuit diagram of a motor-controlling apparatus according to the present invention.

FIG. 1 is a circuit diagram of the motor-controlling apparatus. As is shown in the figure, the Hall signal (i.e., Hall voltage) detected by a Hall element (not shown) is supplied from input terminals 1 to a Hall signal amplifier 2. The amplifier 2 amplifies the Hall signal, and the amplified Hall signal is input to an output amplifier 3. The output amplifier 3 outputs two voltage pulse voltages Va and Vb which are at the same level and 180 out of phase. These voltage pulse voltages Va and Vb are input to the motor coils 6 and 7, respectively. More precisely, the voltage pulse voltage Va is supplied to one end of the motor coil 6 through an output terminal 4, whereas the pulse voltage Vb is supplied to one end of the motor coil 7 through an output terminal 5. A power supply E, the negative pole of which is grounded, applies an external voltage VM to the other ends of the motor coils 6 and 7.

The voltage pulse voltages Va and Vb are supplied also to two 2-input current-outputting comparators 8 and 9. More specifically, the voltage Va is supplied to the first input terminal of the comparator 8, and the voltage Vb to the first input terminal of the comparator 9. The external voltage VM is applied to the second input terminals of the comparators 8 and 9 from the power supply E.

The output terminals of the comparators 8 and 9 are connected to each other, thus forming a node. Hence, the sum of the currents output from the comparators 8 and 9, hereinafter referred to as "output current Ic," is obtained at the node. The output current Ic is supplied to the inverting input terminal (−) of a current-outputting amplifier 11. The current Ic is also supplied to one end of a resistor 12 the other end of which is grounded, and to one end of a capacitor 13 the other end of which is grounded. A constant voltage Vr is applied to the non-inverting input terminal (+) of the amplifier 11.

The output current of the amplifier 11 is fed back to the output amplifier 3.

The comparator 8 compare the external voltage VM with the reverse voltage generated when the pulse voltage Va changes to an off voltage, and converts the difference between the voltages compared into an electric current. Similarly, the comparator 9 compares the external voltage VM with the reverse voltage generated when the pulse voltage Vb changes to an off voltage, and converts the difference between the voltages compared into an electric current. The currents outputs by the comparators 8 and 9 are combined into an output current Ic. The current Ic is delayed by the time-constant circuit constituted by the resistor 12 and the capacitor 13, whereby a voltage Vc is built up across the resistor 12. The voltage Vc is applied to the inverting input terminal of the amplifier 11.

The amplifier 11 outputs a voltage which changes with the difference between the constant voltage Vr applied to the non-inverting input terminal (+) and the voltage Vc applied to the inverting input terminal (−). Further, the amplifier 11 converts the output voltage into a current, which is fed as a bias current back to the amplifier 3.

Hence, the motor-controlling apparatus performs a feedback control achieved by the bias current supplied to the output amplifier 3 in accordance with the gains of the amplifiers 3 and 11. The apparatus is a control circuit in which the output of the output amplifier 3 is stabilized by the comparators 8 and 9.

Figure 2:
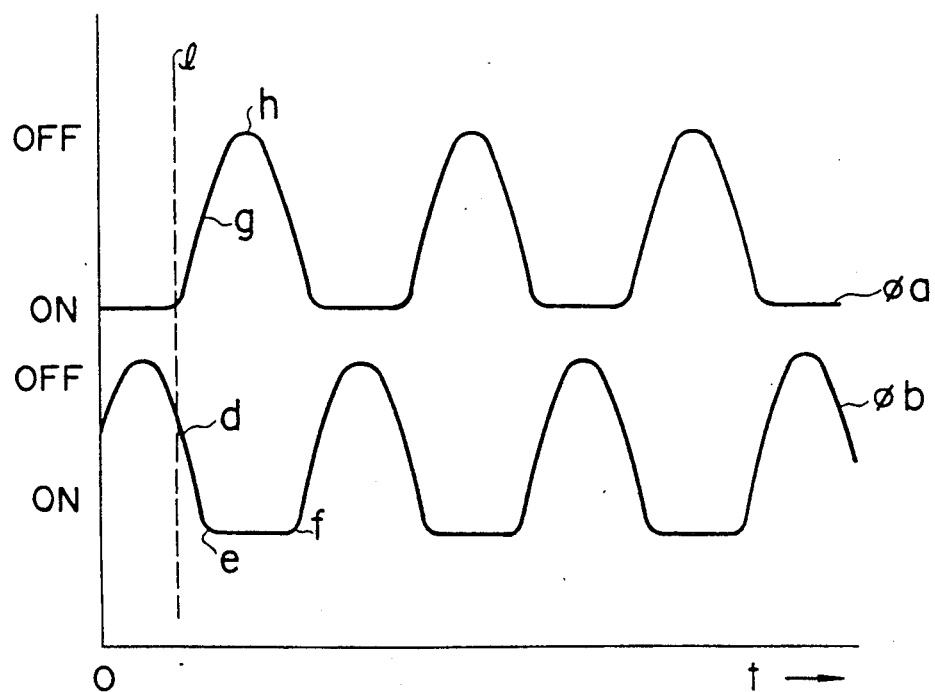
FIG. 2 is a timing chart showing two signals output by the apparatus shown in FIG. 1.

FIG. 2 illustrates the waveforms of the signals this motor-controlling apparatus generates, more precisely, the waveform φa of the pulse voltage Va output by the output amplifier 3, and the waveform φb of the pulse voltage Vb output by the output amplifier 3.

When the output voltage Va starts rising from an on level at the time specified by the broken line l shown in FIG. 2, that is, when the on-output is switched from the voltage Va to the voltage Vb, a reverse voltage is generated in the motor coil 6. The capacitor 13 delays the reverse voltage by a predetermined time, and the resistor 12 converts the delayed voltage into a current, which is supplied to the amplifier 11. Therefore, the bias current supplied to the output amplifier 3 is small for a predetermined period from the time specified by the broken line l. As a result, the voltage Va gradually rises as is evident from the waveform φb. When the voltage Vb reaches its peak value, a reverse voltage is not loner generated.

Then, the voltage Va gradually falls from the peak value as is indicated by arrow d (FIG. 2) to the off level indicated by arrow e. The reverse voltage reaches its maximum value at time indicated by arrow f. On the other hand, the voltage Va gradually rises as is represented by arrow g, then reaches the peak value as is indicated by arrow h, and gradually falls to the on level.

When the on-input is switched from the voltage Vb to the voltage Va, the operations described above are performed in the inverse order.

As has been described above, the output voltage of the motor-controlling apparatus gradually increases and decreases. The peak value of the reverse voltage generated in either motor coil is sufficiently small, despite the motor coil is driven by a pulse voltage. It follows that the output amplifier 3 can be one whose withstand voltage is far lower than that of the output amplifier incorporated in the conventional motor-controlling circuit. Thus, the components of the apparatus shown in FIG. 1 can be smaller than their equivalents used in the prior-art motor-controlling circuit, whereby the apparatus can have a higher integration density than the conventional motor-controlling circuit.

Since the motor-controlling apparatus performs a feedback control, it gradually deceases the changes in the speed rotation of the motor. In other words, the apparatus stabilizes the driving of the motor.

As shown in FIG. 2, the output voltages Va and Vb change smoothly, not abruptly as the pulse-wave voltages output by the conventional motor-controlling circuit. Driven by these voltages Va and Vb, the motor makes but a noise far smaller than the noise it would make if controlled by the conventional motor-controlling circuit.

Moreover, the apparatus can drive a motor at two or more different speeds by changing the voltage Vr applied to the non-inverting input terminal (+) of the amplifier 11, by varying the resistance of the resistor 12, thus changing the voltage applied to the inverting input terminal (−) of the amplifier 11, or by varying the resistance of the resistor connected to the inverting input terminal (−) of the amplifier 11, thereby changing the voltage applied to the inverting input terminal (−) of the amplifier 11.

The present invention is not limited to the embodiment shown in FIG. 1 which controls two motor coils 6 and 7. Needless to say, the invention can be applied to control a motor having any number of motor coils.

What is claimed is:

1. A motor-controlling apparatus for controlling a brushless motor having motor coils, said apparatus comprising:
    amplification means for receiving a signal generated while said brushless motor is rotating and for outputting a plurality of motor-driving voltages which are at a predetermined level and different in phase;
    a plurality of output means for applying the motor-driving voltages to the motor coils of the brushless motor;
    external voltage input means for applying an external voltage to the motor coils of the brushless motor;
    comparator means for comparing the motor-driving voltage applied from each output terminal of said output means with the external voltage applied from said external voltage input means, and outputting a signal representing the difference between the voltages compared; and
    feedback means for feeding the signal output by said comparator means back to said amplification means.

2. The motor-controlling apparatus according to claim 1, in which said feedback means includes a two-input amplifier having a positive input terminal and a negative input terminal, and which further comprises a constant voltage source for supplying a constant voltage to the positive input terminal of said amplifier, and a voltage-changing means for changing the constant voltage, thereby to drive the brushless motor at at least two different speeds.

3. The motor-controlling apparatus according to claim 2, further comprising resistor means connected to the negative input terminal of the two-input amplifier, and resistance-changing means for changing said resistor means, thereby to drive the brushless motor at at least two different speeds.

* * * * *